United States Patent
Nerurkar et al.

(10) Patent No.: US 11,734,846 B2
(45) Date of Patent: Aug. 22, 2023

(54) SYSTEM AND METHOD FOR CONCURRENT ODOMETRY AND MAPPING

(71) Applicant: GOOGLE LLC, Mountain View, CA (US)

(72) Inventors: Esha Nerurkar, Mountian View, CA (US); Simon Lynen, Mountain View, CA (US); Sheng Zhao, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 324 days.

(21) Appl. No.: 16/875,488

(22) Filed: May 15, 2020

(65) Prior Publication Data

US 2020/0278449 A1   Sep. 3, 2020

Related U.S. Application Data

(62) Division of application No. 15/595,617, filed on May 15, 2017, now Pat. No. 10,802,147.

(Continued)

(51) Int. Cl.
*G06T 7/55* (2017.01)
*G06F 3/01* (2006.01)
(Continued)

(52) U.S. Cl.
CPC ............. *G06T 7/55* (2017.01); *G06F 3/011* (2013.01); *G06F 3/038* (2013.01); *G06T 7/73* (2017.01);
(Continued)

(58) Field of Classification Search
CPC .......... G06F 3/011; G06F 3/038; G06F 3/017; G06T 7/55; G06T 7/73;
(Continued)

(56) References Cited

U.S. PATENT DOCUMENTS 9,259,840 B1   2/2016   Chen et al.
2008/0012935 A1   1/2008   Echtenkamp
(Continued)

FOREIGN PATENT DOCUMENTS

CN   102426019 A   4/2012
CN   102541256 A   7/2012
(Continued)

OTHER PUBLICATIONS

Office Action dated Apr. 25, 2021 for Chinese Patent Application No. 201780013650.1, 12 pages.
(Continued)

*Primary Examiner* — John W Lee (57) ABSTRACT

An electronic device tracks its motion in an environment while building a three-dimensional visual representation of the environment that is used to correct drift in the tracked motion. A motion tracking module estimates poses of the electronic device based on feature descriptors corresponding to the visual appearance of spatial features of objects in the environment. A mapping module builds a three-dimensional visual representation of the environment based on a stored plurality of maps, and feature descriptors and estimated device poses received from the motion tracking module. The mapping module provides the three-dimensional visual representation of the environment to a localization module, which identifies correspondences between stored and observed feature descriptors. The localization module performs a loop closure by minimizing the discrepancies between matching feature descriptors to compute a localized pose. The localized pose corrects drift in the estimated pose generated by the motion tracking module.

12 Claims, 6 Drawing Sheets

Related U.S. Application Data (60) Provisional application No. 62/337,987, filed on May 18, 2016.

(51) Int. Cl.

| | | |
|---|---|---|
| *G06F 3/038* | (2013.01) | |
| *G06T 7/73* | (2017.01) | |
| *H04N 13/271* | (2018.01) | |
| *G01S 7/481* | (2006.01) | |
| *H04N 13/156* | (2018.01) | |
| *H04N 13/214* | (2018.01) | |
| *H04N 13/243* | (2018.01) | |
| *G06T 19/20* | (2011.01) | |

(52) U.S. Cl.
CPC .......... *H04N 13/271* (2018.05); *G01S 7/4817* (2013.01); *G06T 2207/10012* (2013.01); *G06T 2207/10028* (2013.01); *G06T 2207/30244* (2013.01); *H04N 13/156* (2018.05); *H04N 13/214* (2018.05); *H04N 13/243* (2018.05)

(58) Field of Classification Search
CPC . G06T 2207/10012; G06T 2207/10028; G06T 2207/30244; G06T 17/05; G06T 19/20; H04N 13/271; H04N 13/156; H04N 13/214; H04N 13/243; G01S 7/4817
See application file for complete search history.

(56) References Cited

U.S. PATENT DOCUMENTS

| | | | |
|---|---|---|---|
| 2010/0094460 A1 | 4/2010 | Choi et al. | |
| 2014/0379256 A1* | 12/2014 | Stipes | G01C 22/006 |
| | | | 701/501 |
| 2015/0071524 A1* | 3/2015 | Lee | G06T 7/593 |
| | | | 382/154 |
| 2016/0078303 A1 | 3/2016 | Samarasekera et al. | |

FOREIGN PATENT DOCUMENTS

| | | |
|---|---|---|
| CN | 104424382 A | 3/2015 |
| CN | 104520913 A | 4/2015 |
| CN | 104811683 A | 7/2015 |
| CN | 103472478 A | 12/2015 |
| CN | 105424026 A | 3/2016 |
| CN | 105447867 A | 3/2016 |

OTHER PUBLICATIONS

Office Action dated May 3, 2021 for European Patent Application No. 17730977.0, 5 pages.
Final Office Action dated Jul. 8, 2020 for U.S. Appl. No. 15/597,366, 32 pages.
Office Action dated Dec. 24, 2020 for Chinese Patent Application No. 201780013624.9, 19 pages.
Office Action dated Oct. 29, 2020 for Chinese Patent Application No. 201780013650.1, 18 pages.
Notice of Allowance dated Jan. 22, 2021 for U.S. Appl. No. 15/597,366, 12 pages.
English Translation of the Notice of Allowance dated Aug. 18, 2021 for Chinese Patent Application No. 201780013650.1, 6 pages.

* cited by examiner

SYSTEM AND METHOD FOR CONCURRENT ODOMETRY AND MAPPING

CROSS-REFERENCE TO RELATED APPLICATIONS

The present application is a divisional of U.S. patent application Ser. No. 15/595,617, entitled "System and Method for Concurrent Odometry and Mapping," filed on May 15, 2017, which claims priority to U.S. Provisional Patent Application Ser. No. 62/337,987, entitled "Methods and Systems for VR/AR Functionality in a Portable Device," filed on May 18, 2016, the entirety of which are incorporated by reference herein.

BACKGROUND

Field of the Disclosure

The present disclosure relates generally to imagery capture and processing and more particularly to machine vision using captured imagery.

Description of the Related Art

Machine vision and display techniques, such as simultaneous localization and mapping (SLAM), visual inertial odometry (VIO), area learning applications, augmented reality (AR), and virtual reality (VR), often rely on the identification of objects within the local environment of a device through the analysis of imagery of the local environment captured by the device. To support these techniques, the device navigates an environment while simultaneously constructing a map of the environment or augmenting an existing map or maps of the environment. However, conventional techniques for tracking motion while building a map of the environment typically take a relatively significant amount of time and resources and accumulate errors, thereby limiting the utility and effectiveness of the machine vision techniques.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving the determination of a relative position or relative orientation of an electronic device based on image-based identification of objects in a local environment of the electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-6 illustrate various techniques for tracking motion of an electronic device in an environment while building a three-dimensional visual representation of the environment that is used to correct drift in the tracked motion. A front-end motion tracking module receives sensor data from visual, inertial, and depth sensors and tracks motion (i.e., estimates poses over time) of the electronic device that can be used by an application programming interface (API). The front-end motion tracking module estimates poses over time based on feature descriptors corresponding to the visual appearance of spatial features of objects in the environment and estimates the three-dimensional positions (referred to as 3D point positions) of the spatial features. The front-end motion tracking module also provides the captured feature descriptors and estimated device pose to a back-end mapping module. The back-end mapping module is configured to store a plurality of maps based on stored feature descriptors, and to periodically receive additional feature descriptors and estimated device poses from the front-end motion tracking module as they are generated while the electronic device moves through the environment. The back-end mapping module builds a three-dimensional visual representation (map) of the environment based on the stored plurality of maps and the received feature descriptors. The back-end mapping module provides the three-dimensional visual representation of the environment to a localization module, which compares generated feature descriptors to stored feature descriptors from the stored plurality of maps, and identifies correspondences between stored and observed feature descriptors. The localization module performs a loop closure by minimizing the discrepancies between matching feature descriptors to compute a localized pose. The localized pose corrects drift in the estimated pose generated by the front-end motion tracking module, and is periodically sent to the front-end motion tracking module for output to the API.

By separately tracking motion based on visual and inertial sensor data and building a three-dimensional representation of the environment based on a plurality of stored maps as well as periodically updated generated feature descriptors, and correcting drift in the tracked motion by performing a loop closure between the generated feature descriptors and the three-dimensional representation, the electronic device can perform highly accurate motion tracking and map-building of an environment even with constrained resources, allowing the electronic device to record a representation of the environment and therefore recognize re-visits to the same environment over multiple sessions. To illustrate, in at least one embodiment the front-end motion tracking module maintains only a limited history of tracked motion (e.g., tracked motion data for only a single prior session, or a single prior time period) and treats any previously-generated feature point position estimates as fixed, thus limiting the computational burden of calculating an estimated current pose and 3D point positions and thus enabling the front-end tracking module to update the estimated current pose at a relatively high rate. The back-end mapping module maintains a more extensive history of the 3D point positions in the environment and poses of the electronic device, thus enabling the back-end mapping module to build a more accurate three-dimensional representation of the environment based on the stored maps and the observed feature descriptors received from the front-end motion tracking module. Because the back-end mapping module carries a heavier computational burden to build the three-dimensional representation of the environment based on a plurality of stored maps and to update the three-dimensional representation based on periodic inputs of additional generated feature descriptors from the front-end motion tracking module, the back-end mapping module updates the three-dimensional representation of the environment at a relatively slow rate. In addition, the localization module optimizes the three-dimensional representation and estimated current pose by solving a co-optimization algorithm that treats previously-generated 3D point positions as variable. The localization module thus corrects drift in the estimated current pose to generate a localized pose, and sends the localized pose to the front-end motion tracking module for output to the API.

Figure 1:
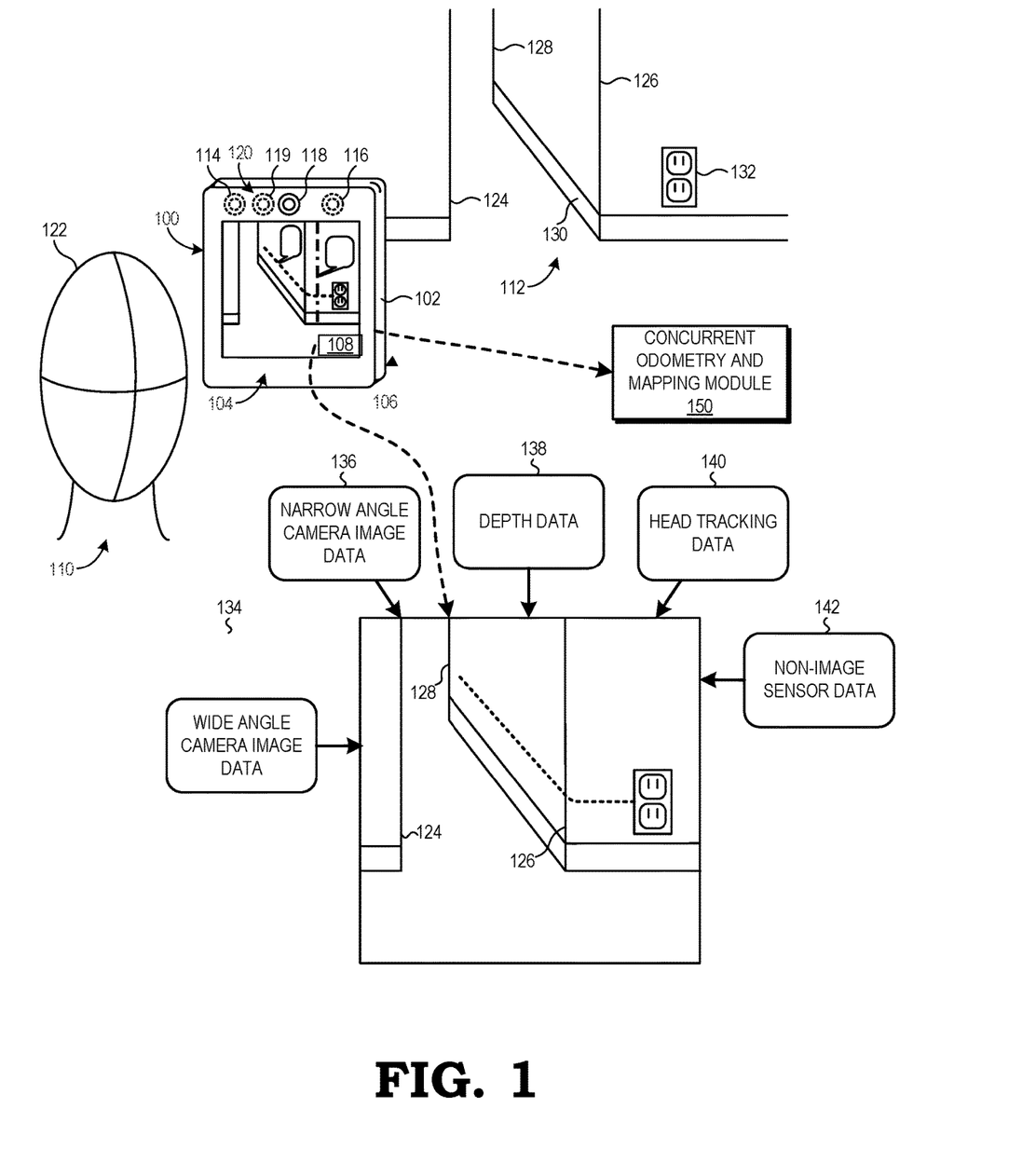
FIG. 1 is a diagram illustrating an electronic device configured to estimate a pose of an electronic device in a local environment using pose information generated based on non-image sensor data and image sensor data while building a map of the local environment in accordance with at least one embodiment of the present disclosure.

FIG. 1 illustrates an electronic device 100 configured to support location-based functionality, such as SLAM, VR, or AR, using image and non-visual sensor data in accordance with at least one embodiment of the present disclosure. The electronic device 100 can include a user-portable mobile device, such as a tablet computer, computing-enabled cellular phone (e.g., a "smartphone"), a head-mounted display (HMD), a notebook computer, a personal digital assistant (PDA), a gaming system remote, a television remote, and the like. In other embodiments, the electronic device 100 can include another type of mobile device, such as an automobile, robot, remote-controlled drone or other airborne device, and the like. For ease of illustration, the electronic device 100 is generally described herein in the example context of a mobile device, such as a tablet computer or a smartphone; however, the electronic device 100 is not limited to these example implementations.

In the depicted example, the electronic device 100 includes a housing 102 having a surface 104 opposite another surface 106. In the example, thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 106 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging sensors 114 and 116 and a depth sensor 120 disposed at the forward-facing surface 106 and an imaging sensor 118 disposed at the user-facing surface 104. In one embodiment, the imaging sensor 114 is implemented as a wide-angle imaging sensor having a fish-eye lens or other wide-angle lens to provide a wider-angle view of the local environment 112 facing the surface 106. The imaging sensor 116 is implemented as a narrow-angle imaging sensor having a typical angle of view lens to provide a narrower angle view of the local environment 112 facing the surface 106. Accordingly, the imaging sensor 114 and the imaging sensor 116 are also referred to herein as the "wide-angle imaging sensor 114" and the "narrow-angle imaging sensor 116," respectively. As described in greater detail below, the wide-angle imaging sensor 114 and the narrow-angle imaging sensor 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via image analysis. The imaging sensor 118 can be used to capture image data for the local environment 112 facing the surface 104. Further, in some embodiments, the imaging sensor 118 is configured for tracking the movements of the head 122 or for facial recognition, and thus providing head tracking information that may be used to adjust a view perspective of imagery presented via the display 108.

The depth sensor 120, in one embodiment, uses a modulated light projector 119 to project modulated light patterns from the forward-facing surface 106 into the local environment, and uses one or both of imaging sensors 114 and 116 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from image analysis (e.g., stereoscopic analysis) of the image data captured by the imaging sensors 114 and 116. Alternatively, the depth data from the depth sensor 120 may be used in place of depth information obtained from image analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview-based reconstruction to determine object depths. Conversely, when the electronic device 100 senses that it is indoors or otherwise in relatively poor lighting conditions, the electronic device 100 may switch to using modulated light-based depth sensing via the depth sensor 120.

The electronic device 100 also may rely on non-visual pose information for pose detection. This non-visual pose information can be obtained by the electronic device 100 via one or more non-visual sensors (not shown in FIG. 1), such as an IMU including one or more gyroscopes, magnetometers, and accelerometers. In at least one embodiment, the IMU can be employed to generate pose information along multiple axes of motion, including translational axes, expressed as X, Y, and Z axes of a frame of reference for the electronic device 100, and rotational axes, expressed as roll, pitch, and yaw axes of the frame of reference for the electronic device 100. The non-visual sensors can also include ambient light sensors and location sensors, such as GPS sensors, or other sensors that can be used to identify a location of the electronic device 100, such as one or more wireless radios, cellular radios, and the like.

To facilitate drift-free, highly accurate motion tracking that can run on a resource-constrained mobile device, the electronic device 100 includes a concurrent odometry and mapping module 150 to track motion of the electronic device 100 based on the image sensor data 134, 136 and the non-image sensor data 142 and to build a three-dimensional representation of the local environment 112. The concurrent odometry and mapping module 150 periodically updates the three-dimensional representation of the local environment 112 with feature descriptors generated based on the image sensor data and the non-visual sensor data. The concurrent odometry and mapping module 150 uses the updated three-dimensional representation of the local environment 112 to correct drift and other pose errors in the tracked motion.

In operation, the electronic device 100 uses the image sensor data and the non-visual sensor data to track motion (estimate a pose) of the electronic device 100. In at least one embodiment, after a reset the electronic device 100 determines an initial estimated pose based on geolocation data, other non-visual sensor data, visual sensor data as described further below, or a combination thereof. As the pose of the electronic device 100 changes, the non-visual sensors generate, at a relatively high rate, non-visual pose information reflecting the changes in the device pose. Concurrently, the visual sensors capture images that also reflect device pose changes. Based on this non-visual and visual pose information, the electronic device 100 updates the initial estimated pose to reflect a current estimated pose, or tracked motion, of the device.

The electronic device 100 generates visual pose information based on the detection of spatial features in image data captured by one or more of the imaging sensors 114, 116, and 118. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the forward-facing imaging sensors 114 and 116 capture wide angle imaging sensor image data 134 and narrow angle imaging sensor image data 136, respectively, that includes these spatial features of the hallway. In this example, the depth sensor 120 also captures depth data 138 that reflects the relative distances of these spatial features relative to the current pose of the electronic device 100. Further, the user-facing imaging sensor 118 captures image data representing head tracking data 140 for the current pose of the head 122 of the user 110. Non-visual sensor data 142, such as readings from the IMU, also is collected by the electronic device 100 in its current pose.

From this input data, the electronic device 100 can determine an estimate of its relative pose, or tracked motion, without explicit absolute localization information from an external source. To illustrate, the electronic device 100 can perform analysis of the wide-angle imaging sensor image data 134 and the narrow-angle imaging sensor image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured images of the image data 134 and 136, determine the initial distances to these spatial features, and then track the changes in position and distances of these spatial features in subsequent captured imagery to determine the change in pose of the electronic device 100 in a free frame of reference. In this approach, certain non-visual sensor data, such as gyroscopic data or accelerometer data, can be used to correlate spatial features observed in one image with spatial features observed in a subsequent image.

In at least one embodiment, the electronic device 100 uses the image data and the non-visual data to generate feature descriptors for the spatial features identified in the captured imagery. Each of the generated feature descriptors describes the orientation, gravity direction, scale, and other aspects of one or more of the identified spatial features. The generated feature descriptors are compared to a set of stored descriptors (referred to for purposes of description as "known feature descriptors") of a plurality of stored maps of the local environment 112 that each identifies previously identified spatial features and their corresponding poses. In at least one embodiment, each of the known feature descriptors is a descriptor that has previously been generated, and its pose definitively established, by either the electronic device 100 or another electronic device. The estimated device poses, 3D point positions, and known feature descriptors can be stored at the electronic device 100, at a remote server (which can combine data from multiple electronic devices) or other storage device, or a combination thereof. Accordingly, the comparison of the generated feature descriptors can be performed at the electronic device 100, at the remote server or other device, or a combination thereof.

In at least one embodiment, a generated feature descriptor is compared to a known feature descriptor by comparing each aspect of the generated feature descriptor (e.g., the orientation of the corresponding feature, the scale of the corresponding feature, and the like) to the corresponding aspect of the known feature descriptor and determining an error value indicating the variance between the compared features. Thus, for example, if the orientation of feature in the generated feature descriptor is identified by a vector A, and the orientation of the feature in the known feature descriptor is identified by a vector B, the electronic device 100 can identify an error value for the orientation aspect of the feature descriptors by calculating the difference between the vectors A and B. The error values can be combined according to a specified statistical technique, such as a least squares technique, to identify a combined error value for each known feature descriptor being compared, and the matching known feature descriptor identifies as the known feature descriptor having the smallest combined error value.

Each of the known feature descriptors includes one or more fields identifying the point position of the corresponding spatial feature and camera poses from which the corresponding spatial feature was seen. Thus, a known feature descriptor can include pose information indicating the location of the spatial feature within a specified coordinate system (e.g., a geographic coordinate system representing Earth) within a specified resolution (e.g., 1 cm), the orientation of the point of view of the spatial feature, the distance of the point of view from the feature and the like. The observed feature descriptors are compared to the feature descriptors stored in the map to identify multiple matched known feature descriptors. The matched known feature descriptors are then stored together with non-visual pose data as localization data that can be used both to correct drift in the tracked motion (or estimated pose) of the electronic device 100 and to augment the plurality of stored maps of a local environment for the electronic device 100.

In some scenarios, the matching process will identify multiple known feature descriptors that match corresponding observed feature descriptors, thus indicating that there are multiple features in the local environment of the electronic device 100 that have previously been identified. The corresponding positions of the matching known feature descriptors may vary, indicating that the electronic device 100 is not in a particular one of the poses indicated by the matching known feature descriptors. Accordingly, the electronic device 100 may refine its estimated pose by interpolating its pose between the poses indicated by the matching known feature descriptors and the pose computed using conventional interpolation techniques. In some scenarios, if the error/difference between matching known feature descriptors and the computed online estimate is above a threshold, the electronic device 100 may snap its estimated pose to the pose indicated by the known feature descriptors.

In at least one embodiment, the concurrent odometry and mapping module 150 generates estimated poses (i.e., tracks motion) of the electronic device 100 at a relatively high rate based on the image sensor data 134, 136 and the non-image sensor data 142 for output to an API. The concurrent odometry and mapping module 150 also generates feature descriptors based on the image sensor data and the non-visual sensor data. The concurrent odometry and mapping module 150 stores a plurality of maps containing known feature descriptors, from which it builds a three-dimensional representation of the local environment 112. The concurrent odometry and mapping module 150 uses the known feature descriptors to map the local environment. For example, the concurrent odometry and mapping module 150 can use the known feature descriptors to generate a map file that indicates the position of each feature included in the known feature descriptors in a frame of reference for the electronic device 100. As the concurrent odometry and mapping module 150 generates new feature descriptors based on the image sensor data and the non-visual sensor data, it periodically augments the three-dimensional representation of the local environment 112 by matching the generated feature descriptors to the known feature descriptors. The concurrent odometry and mapping module 150 uses the three-dimensional representation of the environment 112 to periodically correct drift in the tracked motion. In this manner, the concurrent odometry and mapping module 150 generates a locally accurate estimated pose for output to the API at a relatively high frequency, and periodically corrects global drift in the estimated pose to generate a localized pose using the three-dimensional representation of the local environment 112. The estimated and localized poses can be used to support any of a variety of location-based services. For example, in one embodiment the estimated and localized poses can be used to generate a virtual reality environment, or portion thereof, representing the local environment of the electronic device 100.

Figure 2:
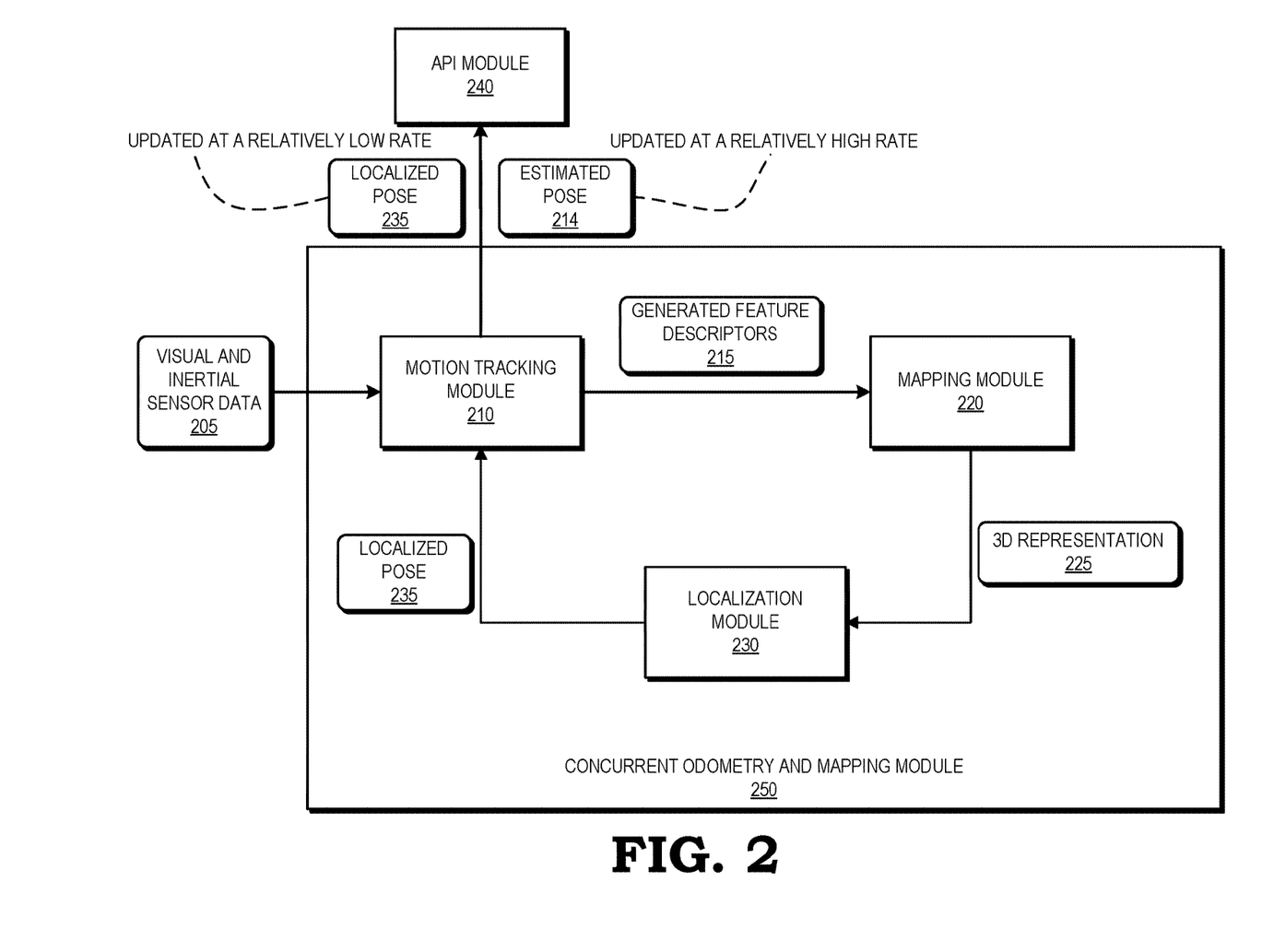
FIG. 2 is a diagram illustrating a concurrent odometry and mapping module of the electronic device of FIG. 1 configured to estimate a current pose of the electronic device and update a map of the environment to localize the estimated current pose in accordance with at least one embodiment of the present disclosure.

FIG. 2 illustrates the components of a concurrent odometry and mapping module 250 of the electronic device 100 of FIG. 1 The concurrent odometry and mapping module 250 includes a front-end motion tracking module 210, a back-end mapping module 220, and a localization module 230. The concurrent odometry and mapping module 250 is configured to output localized and estimated poses to an API module 240. The concurrent odometry and mapping module 250 is configured to track motion to estimate a current pose of the electronic device and update a map of the environment to localize the estimated current pose. In some embodiments, the concurrent odometry and mapping module 250 is configured to track motion (estimate a pose) at a first, relatively higher rate, and to update a map of the environment to be used to localize the estimated pose at a second, relatively lower rate.

The front-end motion tracking module 210 is configured to receive visual sensor data 136 from the imaging cameras 114 and 116, depth data 138 from the depth sensor 120, and inertial sensor data 142 from the non-image sensors (not shown) of FIG. 1. The front-end motion tracking module 210 generates estimated poses 214 from the received sensor data, and generates feature descriptors 215 of spatial features of objects in the local environment 112. In some embodiments, the front-end motion tracking module 210 stores a limited history of tracked motion (e.g., a single prior session, or a single prior time period). In some embodiments, the front-end motion tracking module 210 estimates a current pose of the electronic device 100 by generating linearization points based on the generated feature descriptors and solving a non-linear estimation of the spatial features based on the linearization points and previously-generated linearization points based on stored limited history of tracked motion. In some embodiments, for purposes of solving the non-linear estimation of the spatial features, the front-end motion tracking module treats any previously-generated estimates of 3D point positions as a set of fixed values. Because the previously-generated linearization points are treated as non-variable, the computational burden of solving the non-linear estimation of the spatial features is lower than it would be if the previously-generated linearization points were treated as variable. However, any errors in the previously-generated linearization points may not be rectified by the solution of the non-linear estimation. Accordingly, the estimated current pose may differ from the actual current position and orientation of the electronic device 100.

In some embodiments, the front-end motion tracking module 210 updates the estimated pose 214 at a relatively high rate, based on a continuous or high-frequency receipt of sensor data. Based on the sensor data, the front-end motion tracking module 210 is configured to generate an estimated pose 214 that is locally accurate, but subject to global drift. The front-end motion tracking module 210 provides the estimated pose 214 to an API module 240, which is configured to use the estimated pose 214 to generate a virtual reality environment, or portion thereof, representing the local environment of the electronic device 100. The front-end motion tracking module 210 provides the generated feature descriptors 215 to the mapping module 220. The front-end motion tracking module 210 periodically queries the localization module 230 to check for a localized pose 235. When the localization module 230 has generated a localized pose 235, the localization module 230 provides the localized pose 235 to the motion tracking module 210, which provides the localized pose 235 to the API 240. In some embodiments, the localization module 230 updates the localized pose 235 at a relatively low rate, due to the computational demands of generating the localized pose 235.

The mapping module 220 is configured to store a plurality of maps (not shown) including known feature descriptors and to receive generated feature descriptors 215 from the motion tracking module 210. The stored plurality of maps form a compressed history of the environment and tracked motion of the electronic device 100. The mapping module 220 is configured to augment the stored plurality of maps with newly generated tracked motion. In some embodiments, the mapping module 220 receives generated feature descriptors from the motion tracking module 210 periodically, for example, every five seconds. In some embodiments, the mapping module 220 receives generated feature descriptors 215 from the front-end motion tracking module 210 after a threshold amount of sensor data has been received by the front-end motion tracking module 210. The mapping module 220 builds a three-dimensional representation of the local environment 112 of the electronic device 100 based on the known feature descriptors of the stored plurality of maps and the generated feature descriptors received from the motion tracking module 210. The mapping module 220 matches the one or more spatial features to spatial features of the plurality of stored maps to generate the three-dimensional representation 225 of the electronic device 100. In some embodiments, the mapping module 220 searches each generated feature descriptor 215 to determine any matching known feature descriptors of the stored plurality of maps.

In some embodiments, the mapping module 220 adds the generated feature descriptors received from the motion tracking module 210 by generating estimates of 3D point positions based on the generated feature descriptors and solving a non-linear estimation of the three-dimensional representation based on the device poses and 3D point positions based on the stored feature descriptors and the data from the inertial sensors. In some embodiments, the previously-generated linearization points are considered variable for purposes of solving the non-linear estimation of the three-dimensional representation. The mapping module 220 provides the three-dimensional representation 225 of the local environment 112 to the localization module 230.

The localization module 230 is configured to use the matched descriptors to align the estimated pose 214 with the stored plurality of maps, such as by applying a loop-closure algorithm. Thus, the localization module 230 can use matched feature descriptors to estimate a transformation for one or more of the stored plurality of maps, whereby the localization module 230 transforms geometric data associated with the generated feature descriptors of the estimated pose 214 having matching descriptors to be aligned with geometric data associated with a stored map having a corresponding matching descriptor. When the localization module 230 finds a sufficient number of matching feature descriptors from the generated feature descriptors 215 and a stored map to confirm that the generated feature descriptors 215 and the stored map contain descriptions of common visual landmarks, the localization module 230 performs a transformation between the generated feature descriptors 215 and the matching known feature descriptors, aligning the geometric data of the matching feature descriptors. Thereafter, the localization module 230 can apply a co-optimization algorithm to refine the alignment of the pose and scene of the estimated pose 214 of the electronic device 100 to generate a localized pose 235.

Figure 3:
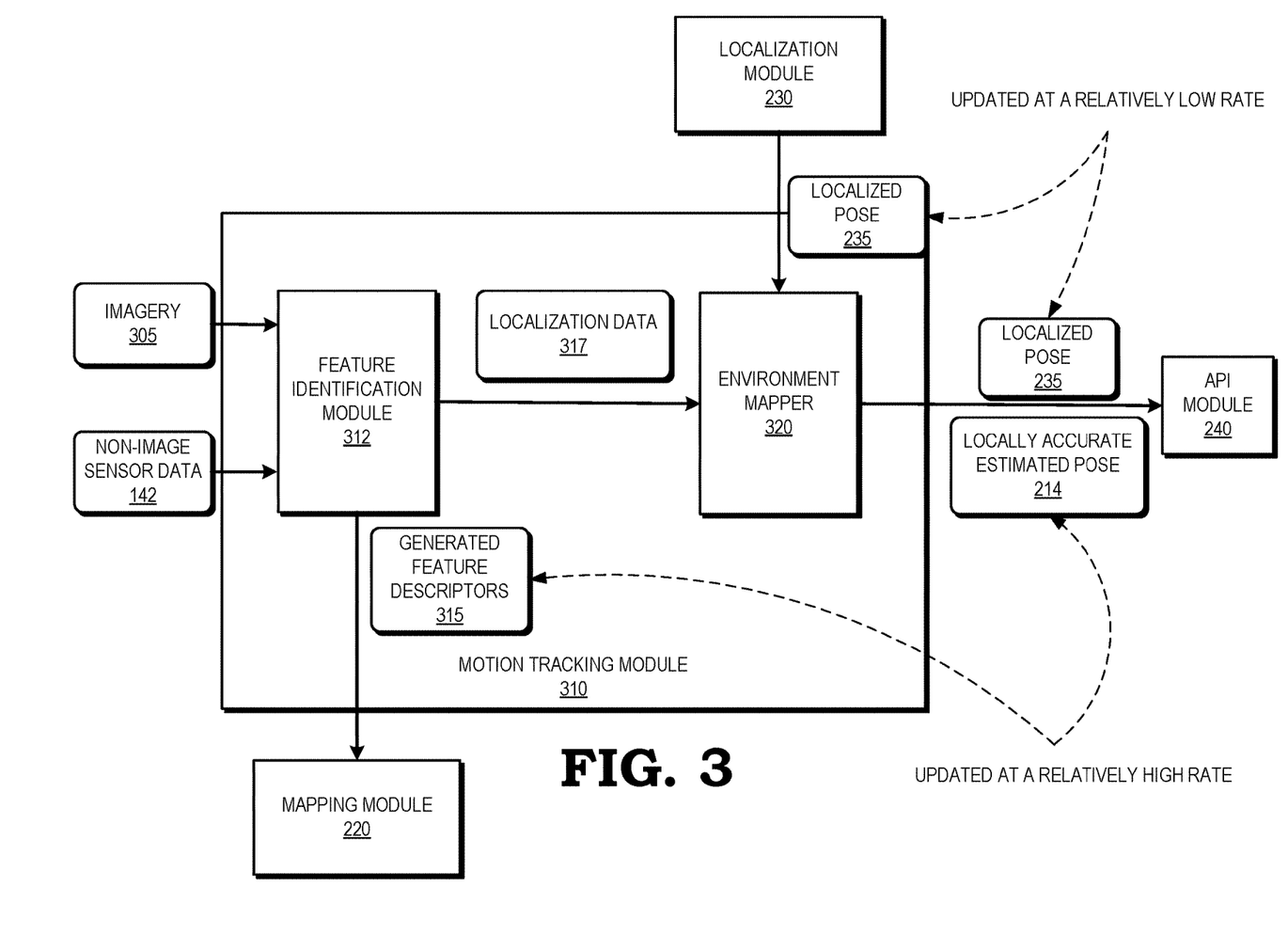
FIG. 3 is a diagram illustrating a motion tracking module of the concurrent odometry and mapping module of FIG. 2 configured to generate feature descriptors of spatial features of objects in the environment for updating a map of the environment and estimating a pose of the electronic device in accordance with at least one embodiment of the present disclosure.

FIG. 3 illustrates the components of a front-end motion tracking module 310 of FIGS. 1 and 2. The motion tracking module 310 includes a feature identification module 312 and an environment mapper 320. Each of these modules represents hardware, software, or a combination thereof, configured to execute the operations as described herein. In particular, the feature identification module 312 is configured to receive imagery 305, representing images captured by the imaging sensors 114, 116, 118, and the non-visual sensor data 142. Based on this received data, the feature identification module 312 identifies features in the imagery 305 by generating feature descriptors 315 and comparing the feature descriptors to known feature descriptors from the stored limited history of tracked motion as described above with respect to FIG. 2. The feature identification module 312 provides the generated feature descriptors 315 to the mapping module 220. The feature identification module 312 additionally stores the feature descriptors 315, together with any associated non-visual data, as localization data 317. In at least one embodiment, the localization data 317 can be used by the electronic device 100 to estimate one or more poses of the electronic device 100 as it is moved through different locations and orientations in its local environment. These estimated poses can be used in conjunction with previously generated and stored map information for the local environment to support or enhance location based services of the electronic device 100.

The environment mapper 320 is configured to generate or modify a locally accurate estimated pose 214 of the electronic device 100 based on the localization data 317. In particular, the environment mapper 320 analyzes the feature descriptors in the localization data 317 to identify the location of the features in a frame of reference for the electronic device 100. For example, each feature descriptor can include location data indicating a relative position of the corresponding feature from the electronic device 100. In some embodiments, the environment mapper 320 generates linearization points based on the localization data 317 and solves a non-linear estimation, such as least squares, of the environment based on the linearization points and previously-generated linearization points based on the stored feature descriptors from the stored limited history of tracked motion. The environment mapper 320 estimates the evolution of the device pose over time as well as the positions of 3D points in the environment 112. To find matching values for these values based on the sensor data, the environment mapper 320 solves a non-linear optimization problem. In some embodiments, the environment mapper 320 solves the non-linear optimization problem by linearizing the problem and applying standard techniques for solving linear systems of equations. In some embodiments, the environment mapper 320 treats the previously-generated linearization points as fixed for purposes of solving the non-linear estimation of the environment. The environment mapper 320 can reconcile the relative positions of the different features to identify the location of each feature in the frame of reference, and store these locations in a locally accurate estimated pose 214. The front-end motion tracking module 310 provides and updates the estimated pose 214 at a relatively high rate to an API module 240 of the electronic device 100 to, for example, generate a virtual reality display of the local environment.

The environment mapper 320 is also configured to periodically query the localization module 230 for an updated localized pose 235. In some embodiments, the localization module 230 updates the localized pose 235 at a relatively low rate. When an updated localized pose 235 is available, the localization module 230 provides the updated localized pose 235 to the environment mapper 320. The environment mapper 320 provides the updated localized pose 235 to the API module 240.

Figure 4:
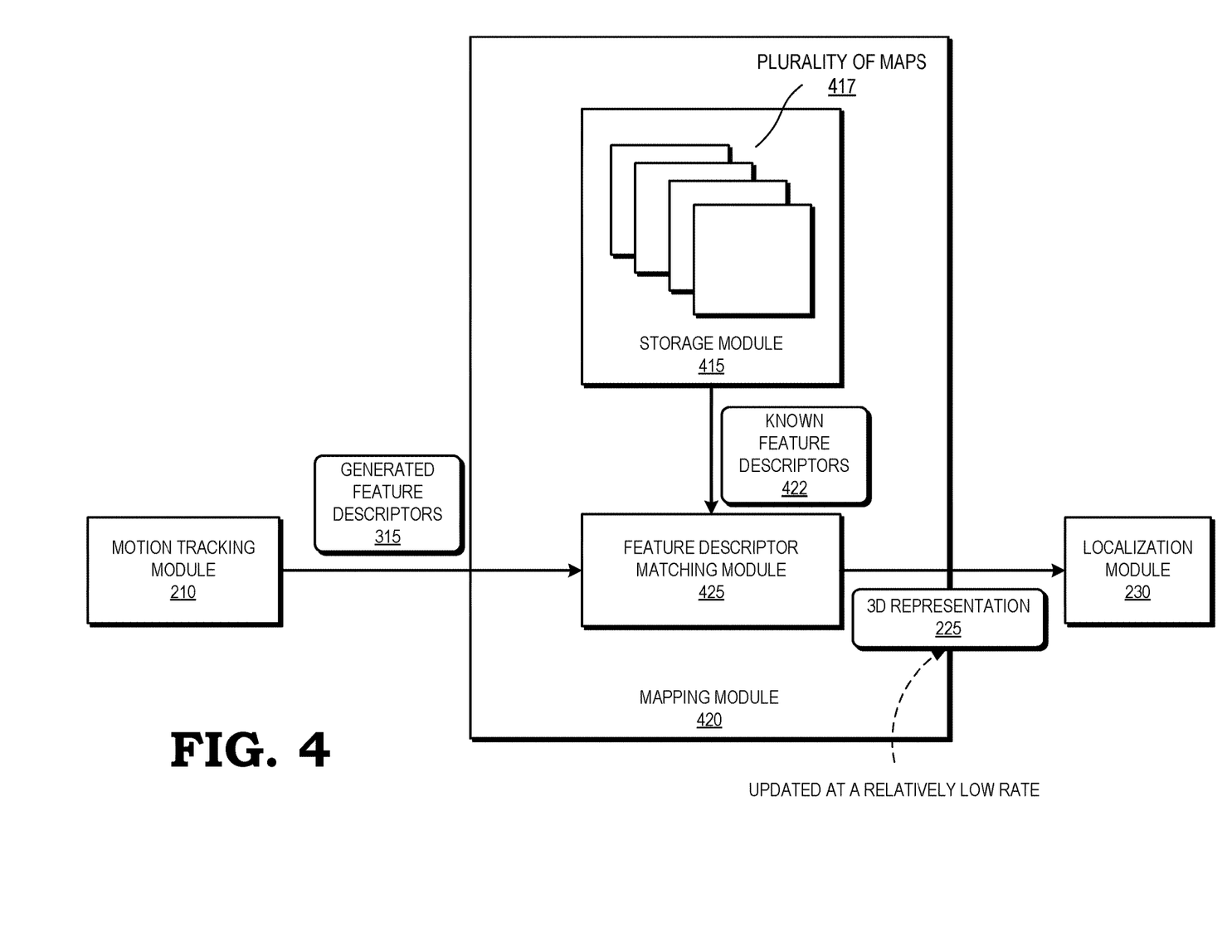
FIG. 4 is a diagram illustrating a mapping module of the concurrent odometry and mapping module of FIG. 2 configured to generate and add to a three-dimensional representation of the environment of the electronic device based on generated feature descriptors and a plurality of stored maps in accordance with at least one embodiment of the present disclosure.

FIG. 4 is a diagram illustrating a back-end mapping module 420 of the concurrent odometry and mapping module 250 of FIG. 2 configured to generate and add to a three-dimensional representation of the environment of the electronic device 100 based on generated feature descriptors 315 and a plurality of stored maps 417 in accordance with at least one embodiment of the present disclosure. The back-end mapping module 420 includes a storage module 415 and a feature descriptor matching module 425.

The storage module 415 is configured to store a plurality of maps 417 of the environment of the electronic device 100. In some embodiments, the plurality of maps 417 may include maps that were previously generated by the electronic device 100 during prior mapping sessions. In some embodiments, the plurality of maps 417 may also include VR or AR maps that contain features not found in the physical environment of the electronic device 100. The plurality of maps 417 include stored (known) feature descriptors 422 of spatial features of objects in the environment that can collectively be used to generate a three-dimensional representation 225 of the environment.

The feature descriptor matching module 425 is configured to receive generated feature descriptors 315 from the motion tracking module 210. The feature descriptor matching module 425 compares the generated feature descriptors 315 to the known feature descriptors 422. The feature descriptor matching module 425 builds a three-dimensional representation 225 of the local environment 112 of the electronic device 100 based on the known feature descriptors 422 of the stored plurality of maps 417 and the generated feature descriptors 315 received from the front-end motion tracking module 210.

In some embodiments, the feature descriptor matching module 425 adds the generated feature descriptors 315 received from the motion tracking module 210 by generating linearization points based on the generated feature descriptors and solving a non-linear estimation of the three-dimensional representation based on the linearization points and previously-generated linearization points based on the known feature descriptors 422. In some embodiments, the previously-generated linearization points are considered variable for purposes of solving the non-linear estimation of the three-dimensional representation. The feature descriptor matching module 425 provides the three-dimensional representation 225 of the environment to the localization module 230 and, in some embodiments, updates the three-dimensional representation 225 at a relatively low rate.

The mapping module 420 receives generated feature descriptors 315 from the motion tracking module 210 periodically. In some embodiments, the mapping module 420 receives generated feature descriptors 315 from the front-end motion tracking module 210 at regular intervals of time (e.g., every five seconds). In some embodiments, the mapping module 420 receives generated feature descriptors 315 from the front-end motion tracking module 210 at the conclusion of a mapping session or after a threshold amount of sensor data has been received by the front-end motion tracking module 210.

Figure 5:
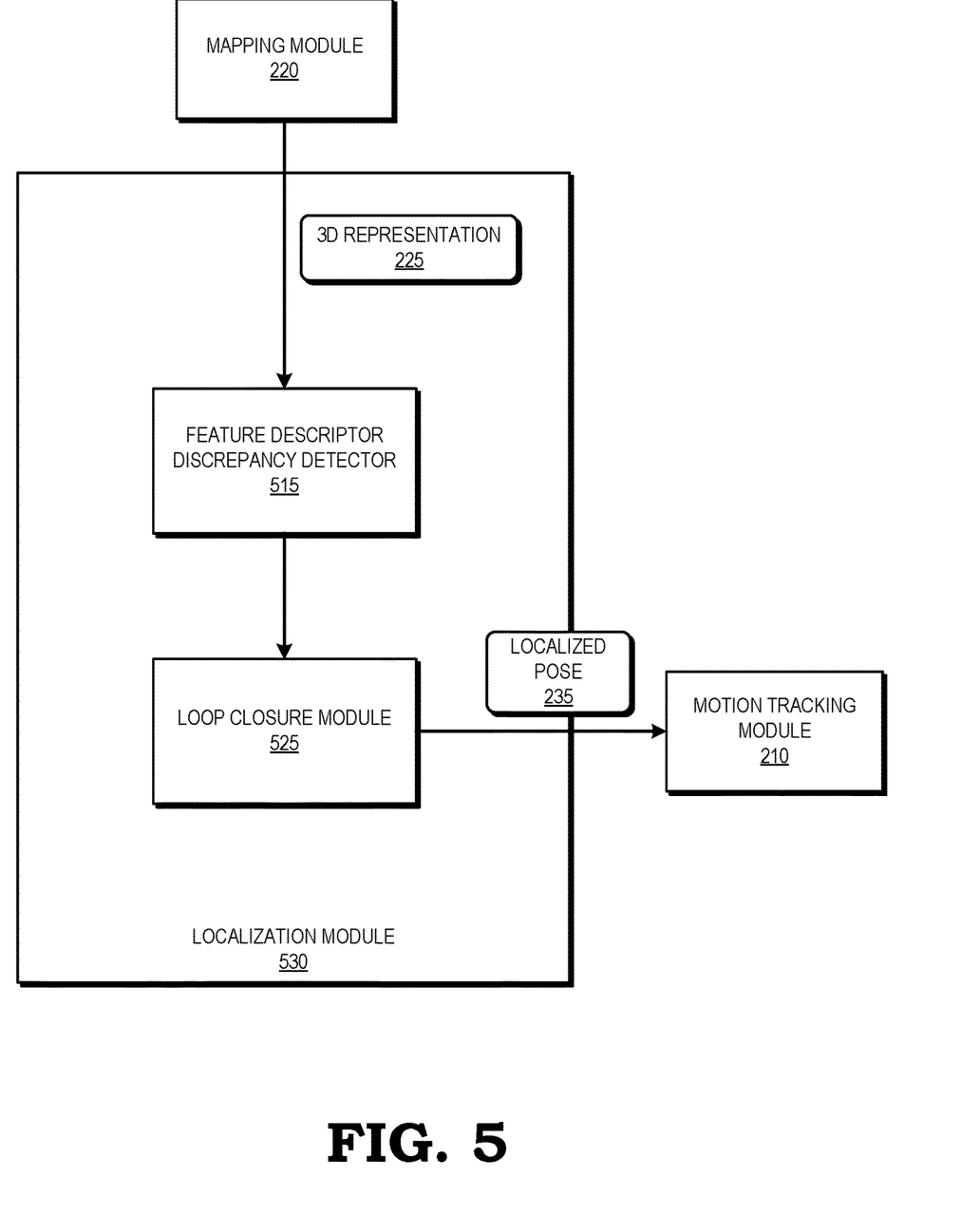
FIG. 5 is a diagram illustrating a localization module of the concurrent odometry and mapping module of FIG. 2 configured to generate a localized pose of the electronic device in accordance with at least one embodiment of the present disclosure.

FIG. 5 is a diagram illustrating a localization module 530 of the concurrent odometry and mapping module 250 of FIG. 2 configured to generate a localized pose 235 of the electronic device 100 in accordance with at least one embodiment of the present disclosure. The localization module 530 includes a feature descriptor discrepancy detector 515 and a loop closure module 525.

The feature descriptor discrepancy detector 515 is configured to receive a three-dimensional representation 225 of the environment from the back-end mapping module 220 of the concurrent odometry and mapping module 250. The feature descriptor discrepancy detector 515 analyses the matched feature descriptors of the three-dimensional representation 225 and identifies discrepancies between matched feature descriptors. The feature descriptor discrepancy detector 515 transforms geometric data associated with the generated feature descriptors of the estimated pose 214 having matching descriptors to be aligned with geometric data associated with a stored map having a corresponding matching descriptor. When the localization module 230 finds a sufficient number of matching feature descriptors from the generated feature descriptors 215 and a stored map to confirm that the generated feature descriptors 215 and the stored map contain descriptions of common visual landmarks, the localization module 230 computes a transformation between the generated feature descriptors 215 and the matching known feature descriptors, aligning the geometric data of the matching feature descriptors.

The loop closure module 525 is configured to find a matching pose of the device given the 3D position points in the environment and their observations in the current image by solving a co-optimization algorithm to refine the alignment of the matching feature descriptors. The co-optimization problem may be solved by a Gauss-Newton or Levenberg-Marquardt algorithm, or another known algorithm for optimizing transformations to generate a localized pose 235 of the electronic device 100. In some embodiments, the loop closure module 525 treats known feature descriptors as variable. The loop closure module 525 thus generates a localized pose 235 that corrects drift in the estimated pose 214, and sends the localized pose 235 to the front-end motion tracking module 210. The localized pose 235 can be fed to an application executing at the electronic device 100 to enable augmented reality or other location-based functionality by allowing the electronic device 100 to more efficiently and accurately recognize a local environment 112 that it has previously traversed.

Figure 6:
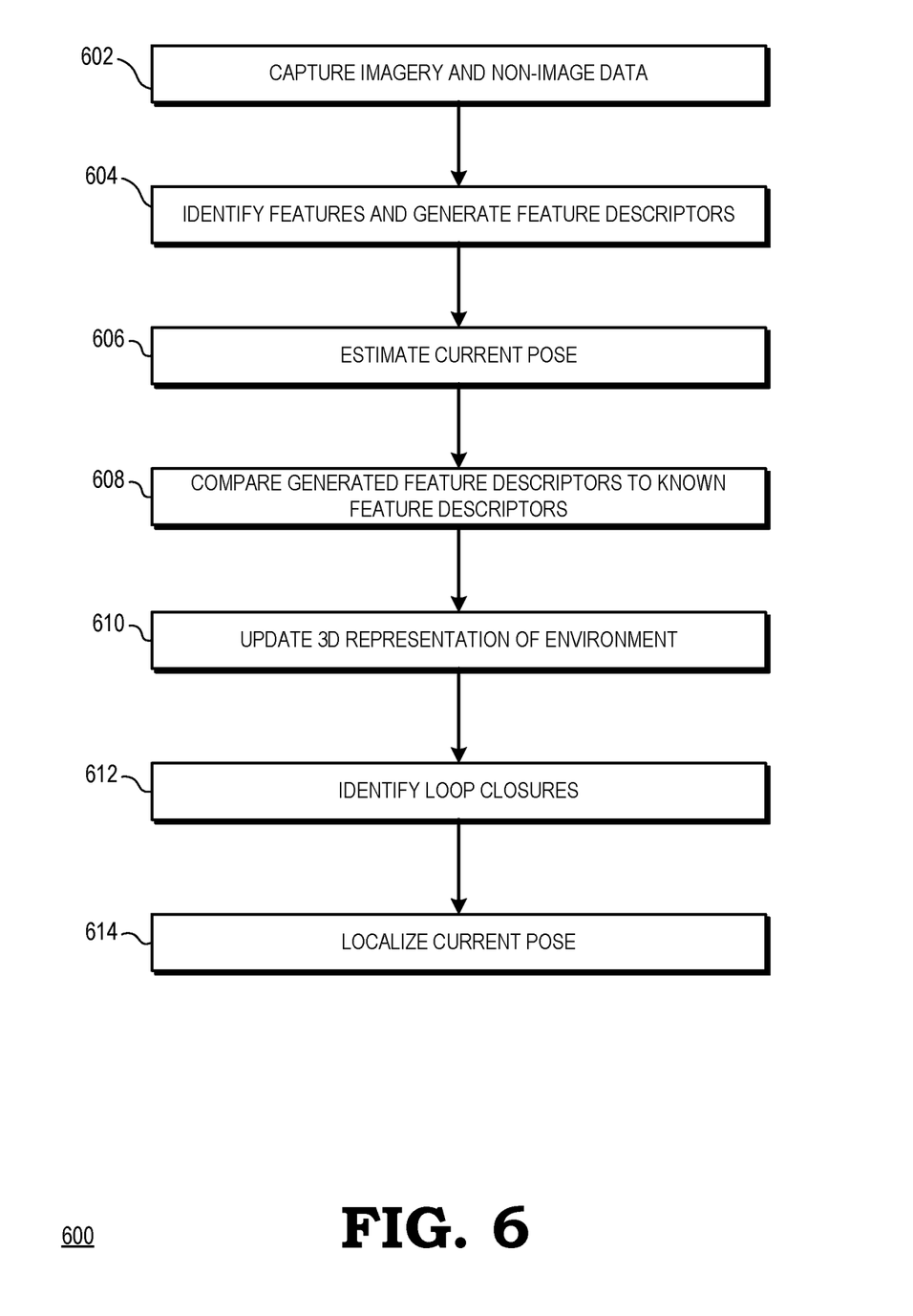
FIG. 6 is a flow diagram illustrating an operation of an electronic device to track motion and update a three-dimensional representation of the environment in accordance with at least one embodiment of the present disclosure.

FIG. 6 is a flow diagram illustrating method 600 of an electronic device to track motion and update a three-dimensional representation of the environment in accordance with at least one embodiment of the present disclosure. The method 600 initiates at block 602 where the electronic device 100 captures imagery and non-visual data as it is moved by a user through different poses in a local environment. At block 604, the front-end motion tracking module 210 identifies features of the local environment based on the imagery 305 and non-image sensor data 142, and generates feature descriptors 215 for the identified features for the back-end mapping module 220 and localization data 317. At block 606, the motion tracking module 210 uses the localization data 317 to estimate a current pose 214 of the electronic device 100 in the local environment 112. The estimated pose 214 can be used to support location-based functionality for the electronic device 100. For example, the estimated pose 214 can be used to orient a user of the electronic device 100 in a virtual reality or augmented reality application executed at the electronic device 100.

At block 608, the back-end mapping module 220 compares the generated feature descriptors 215 to known feature descriptors of a plurality of stored maps. At block 610, the back-end mapping module 220 builds and/or updates a three-dimensional representation 225 of the environment of the electronic device which it provides to the localization module 230. At block 612, the localization module 230 identifies discrepancies between matching feature descriptors and performs a loop closure to align the estimated pose 214 with the three-dimensional representation 225. At block 614, the localization module localizes the current pose of the electronic device, and the concurrent odometry and mapping module 250 provides the localized pose to an API module 240.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    tracking, at a head mounted device, motion of the head mounted device relative to an environment of the head mounted device based on one or more spatial features representing one or more objects in the environment;
    estimating, at the head mounted device, a pose of the head mounted device based on the one or more spatial features representing the one or more objects in the environment;
    generating, at the head mounted device, a three-dimensional visual representation of the environment of the head mounted device based on the one or more spatial features;
    periodically updating the generated three-dimensional visual representation of the environment based on one or more feature descriptors of the one or more spatial features representing one or more objects in the environment; and
    correcting, at the head mounted device, one or more drift errors in the estimated pose of the head mounted device using the updated generated three-dimensional visual representation of the environment.

2. The method of claim 1, further comprising:
    capturing, at the head mounted device, image sensor data using one or more visual sensors integrated with the head mounted device; and
    capturing, at the head mounted device, non-image sensor data using one or more non-image sensors integrated with the head mounted device.

3. The method of claim 2, further comprising generating the one or more spatial features based on the captured image sensor data from the one or more visual sensors and the captured non-image sensor data from the one or more non-image sensors integrated with the head mounted device.

4. The method of claim 2, further comprising generating, at the head mounted device, the one or more feature descriptors of the one or more spatial features representing one or more objects in the environment based on the captured image sensor data from the one or more visual sensors and the captured non-image sensor data from the one or more non-image sensors integrated with the head mounted device.

5. The method of claim 4, wherein correcting, at the head mounted device, the one or more drift errors comprises performing, at the head mounted device, a loop-closure between the one or more generated feature descriptors and the updated generated three-dimensional visual representation of the environment.

6. The method of claim 4, wherein correcting, at the head mounted device, the one or more drift errors is based in part on comparing the one or more generated feature descriptors to one or more stored feature descriptors.

7. The method of claim 1, further comprising generating, at the head mounted device, a localized pose of the head mounted device based on correcting the one or more drift errors in the estimated pose of the head mounted device.

8. A head mounted device, comprising:
   a motion tracking module configured to track motion of the head mounted device relative to an environment of the head mounted device based on one or more spatial features representing one or more objects in the environment, wherein the motion tracking module is further to estimate a pose of the head mounted device based on the one or more spatial features representing the one or more objects in the environment;
   a mapping module configured to generate and periodically update a three-dimensional visual representation of the environment of the head mounted device based on the one or more spatial features and one or more feature descriptors of the one or more spatial features; and
   a loop closure module configured to correct one or more drift errors in the estimated pose of the head mounted device using the updated generated three-dimensional visual representation of the environment.

9. The head mounted device of claim 8, further comprising:
   a visual sensor configured to capture image sensor data; and
   a non-image sensor configured to capture non-image sensor data.

10. The head mounted device of claim 9, wherein the motion tracking module is further to generate the one or more spatial features based on the captured image sensor data from the visual sensors and the captured non-image sensor data from the non-image sensor.

11. The head mounted device of claim 9, wherein the motion tracking module is further to generate the one or more feature descriptors of the one or more spatial features representing one or more objects in the environment based on the captured image sensor data from the visual sensor and the captured non-image sensor data from the non-image sensor.

12. The head mounted device of claim 11, wherein the loop closure module is further to perform a loop-closure between the one or more generated feature descriptors and the updated generated three-dimensional visual representation of the environment.

* * * * *